US012804576B2

(12) United States Patent
Dalsgaard et al.

(10) Patent No.: US 12,804,576 B2
(45) Date of Patent: Nov. 17, 2026

(54) TIMING ADVANCE ALIGNMENT FOR USER EQUIPMENT AUTONOMOUS UPLINK TIMING ADJUSTMENT AT BEAM CHANGE

(71) Applicant: Nokia Technologies Oy, Espoo (FI)

(72) Inventors: Lars Dalsgaard, Oulu (FI); Dmitry Petrov, Espoo (FI)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 18/702,226

(22) PCT Filed: Oct. 20, 2021

(86) PCT No.: PCT/EP2021/079095
§ 371 (c)(1),
(2) Date: Apr. 17, 2024

(87) PCT Pub. No.: WO2023/066479
PCT Pub. Date: Apr. 27, 2023

(65) Prior Publication Data
US 2025/0240748 A1 Jul. 24, 2025

(51) Int. Cl.
*H04W 56/00* (2009.01)
*H04B 7/06* (2006.01)
(Continued)

(52) U.S. Cl.
CPC .... *H04W 56/0045* (2013.01); *H04B 7/06952* (2023.05); *H04W 56/001* (2013.01);
(Continued)

(58) Field of Classification Search
CPC ........... H04W 56/0045; H04W 56/001; H04W 56/004; H04W 74/0833; H04W 74/0836;
(Continued)

(56) References Cited

U.S. PATENT DOCUMENTS 11,638,298 B2 * 4/2023 Zhang .................. H04B 7/0619 370/329
2007/0149206 A1 * 6/2007 Wang ................ H04W 56/0045 455/450
(Continued)

FOREIGN PATENT DOCUMENTS

WO 2021/026802 A1 2/2021
WO 2021/139665 A1 7/2021
WO 2023/011731 A1 2/2023
WO 2023/011734 A1 2/2023

OTHER PUBLICATIONS

"WF on FR2 HST Deployment Scenario Analysis", 3GPP TSG-RAN WG4#98-bis-e Meeting, R4-2106100, Samsung, Apr. 12-20, 2021, pp. 1-16.
(Continued)

*Primary Examiner* — Mohamed A Kamara
(74) *Attorney, Agent, or Firm* — Lippes Mathias LLP

(57) ABSTRACT

Example embodiments generally relate to devices and methods for implementing timing advance alignment between UE and the network for UE autonomous uplink timing advance adjustment at beam change. The UE may be configured to switch from a first beam associated with a first access point to a second beam associated with a second access point, perform autonomous timing adjustment based on a timing difference between a first timing associated with the first access point and a second timing associated with the second access point, and transmit assistant information related to the timing difference to the second access point.

15 Claims, 11 Drawing Sheets

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC .......... H04W 74/0838; H04W 56/0055; H04B 7/06952; H04B 7/024
See application file for complete search history.

(56) References Cited

U.S. PATENT DOCUMENTS

| | | | | |
|---|---|---|---|---|
| 2008/0084849 | A1* | 4/2008 | Wang | H04W 56/0045 370/332 |
| 2015/0327249 | A1* | 11/2015 | Kitazoe | H04W 52/50 370/329 |
| 2019/0159149 | A1 | 5/2019 | Ryu et al. | |
| 2020/0029292 | A1 | 1/2020 | Zou et al. | |
| 2020/0267609 | A1 | 8/2020 | Ly et al. | |
| 2021/0058884 | A1 | 2/2021 | Liu et al. | |
| 2021/0219350 | A1* | 7/2021 | Wu | H04L 69/324 |
| 2022/0159579 | A1* | 5/2022 | Cirik | H04L 5/0051 |
| 2024/0292420 | A1* | 8/2024 | Fang | H04W 56/0045 |

OTHER PUBLICATIONS

"WF on FR2 HST RRM requirements", 3GPP TSG-RAN WG4 Meeting #99-e, R4-2108342, Agenda: 9.8.4, Nokia, May 19-27, 2021, pp. 1-22.

"Enhancement on HST-SFN deployment", 3GPP TSG-RAN WG1 Meeting #104b-e, Tdoc R1-2103198, Agenda: 8.1.2.4, Ericsson, Apr. 12-20, 2021, pp. 1-17.

"Msc-generator", Sourceforge, Retrieved on , May 6, 2024, Webpage available at :https://sourceforge.net/projects/msc-generator/.

"3rd Generation Partnership Project; Technical Specification Group Radio Access Network; NR; Requirements for support of radio resource management (Release 17)", 3GPP TS 38.133, V17.2.0, Jun. 2021, 3177 pages.

"3rd Generation Partnership Project; Technical Specification Group Radio Access Network; NR; Physical layer procedures for control (Release 16)", 3GPP TS 38.213, V16.6.0, Jun. 2021, pp. 1-187.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

Zhen et al., "Preamble Design and Detection for 5G Enabled Satellite Random Access", IEEE Access, vol. 08, Mar. 10, 2020, pp. 49873-49884.

International Search Report and Written Opinion received for corresponding Patent Cooperation Treaty Application No. PCT/EP2021/079095, dated Jul. 14, 2022, 15 pages.

"On HST FR2 UL Timing Requirements", 3GPP TSG-RAN WG4 Meeting # 100-e, R4-2114561, Agenda: 9.9.4.4, Nokia, Aug. 16-27, 2021, 5 pages.

"Techniques mitigating Rx/Tx timing delays", 3GPP TSG-RAN WG1 Meeting #106-bis-e, R1-2110349, Agenda: 8.5.1, Ericsson, Oct. 11-19, 2021, 36 pages.

* cited by examiner

100

TIMING ADVANCE ALIGNMENT FOR USER EQUIPMENT AUTONOMOUS UPLINK TIMING ADJUSTMENT AT BEAM CHANGE

RELATED APPLICATION

This application claims priority to PCT Patent Application No. PCT/EP2021/079095, filed Oct. 20, 2021, and entitled "TIMING ADVANCE ALIGNMENT FOR USER EQUIPMENT AUTONOMOUS UPLINK TIMING ADJUSTMENT AT BEAM CHANGE", which is incorporated herein by reference in its entirety.

TECHNICAL FIELD

Example embodiments described herein generally relate to communication technologies, and more particularly, to devices and methods for implementing timing advance (TA) alignment between user equipment (UE) and a base station for UE autonomous uplink TA adjustment at beam change.

BACKGROUND

Certain abbreviations that may be found in the description and/or in the figures are herewith defined as follows:

AP Access Point
CE Control Element
CU Centralized Unit
CSI-RS Channel State Information Reference Signal
DCI Downlink Control Information
DU Distributed Unit
FR2 Frequency Range 2
gNB next Generation Node-B
HST High Speed Train
MAC Medium Access Control
NR New Radio
PD Propagation Delay
PDCCH Physical Downlink Control Channel
PRACH Physical Random Access Channel
RRC Radio Resource Control
RRH Remote Radio Head
RRU Remote Radio Unit
SSB Synchronization Signal Block
TA Timing Advance
TAC TA (adjustment) Command
TCI Transmission Configuration Indicator
UE User Equipment In 5G New Radio (NR), a base station can be divided into two physical and/or logical entities, i.e., a centralized unit (CU) and a distributed unit (DU). There are several functional split options between the CU and the DU. Generally speaking, the CU provides higher layer functionalities, and the DU provides lower layer functionalities. The DU may be connected via optical fibers to one or more remote radio heads (RRHs) (also known as remote radio units, RRUs). The RRHs include one or more transceivers to receive and transmit signals from and to user equipment (UE). The RRHs may also handle beamforming functionalities. In Frequency Range 2 (FR2), it is a common understanding that both the UE and the network will use beamforming in order to ensure a sufficient link budget.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of user equipment is provided. The user equipment may comprise at least one processor and at least one memory including computer program code. The at least one memory and the computer program code may be configured to, with the at least one processor, cause the user equipment to perform actions of switching from a first beam associated with a first access point to a second beam associated with a second access point, performing autonomous timing adjustment based on a timing difference between a first timing associated with the first access point and a second timing associated with the second access point, and transmitting assistant information related to the timing difference to the second access point.

In a second aspect, an example embodiment of a base station is provided. The base station may comprise at least one processor and at least one memory including computer program code. The at least one memory and the computer program code may be configured to, with the at least one processor, cause the base station to perform actions of receiving from user equipment assistant information related to a timing difference between a first timing associated with a first access point and a second timing associated with a second access point, the base station including at least the second access point, and updating uplink timing of the user equipment maintained at the base station based on the assistant information.

Example embodiments of methods, apparatus and computer program products are also provided. Such example embodiments generally correspond to the above example embodiments of the user equipment and the base station, and a repetitive description thereof is omitted here for convenience.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which terminal devices can access the network or receive services. The network device may be commonly referred to as a base transceiver station (BTS) or base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may include several distributed network units, such as a centralized unit (CU), one or more distributed units (DUs), one or more remote radio heads (RRHs) or remote radio units (RRUs). The number and functions of these distributed units depend on the applied split RAN architecture.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with UE, a user terminal, a mobile terminal, a mobile station, or a wireless device.

Figure 1:
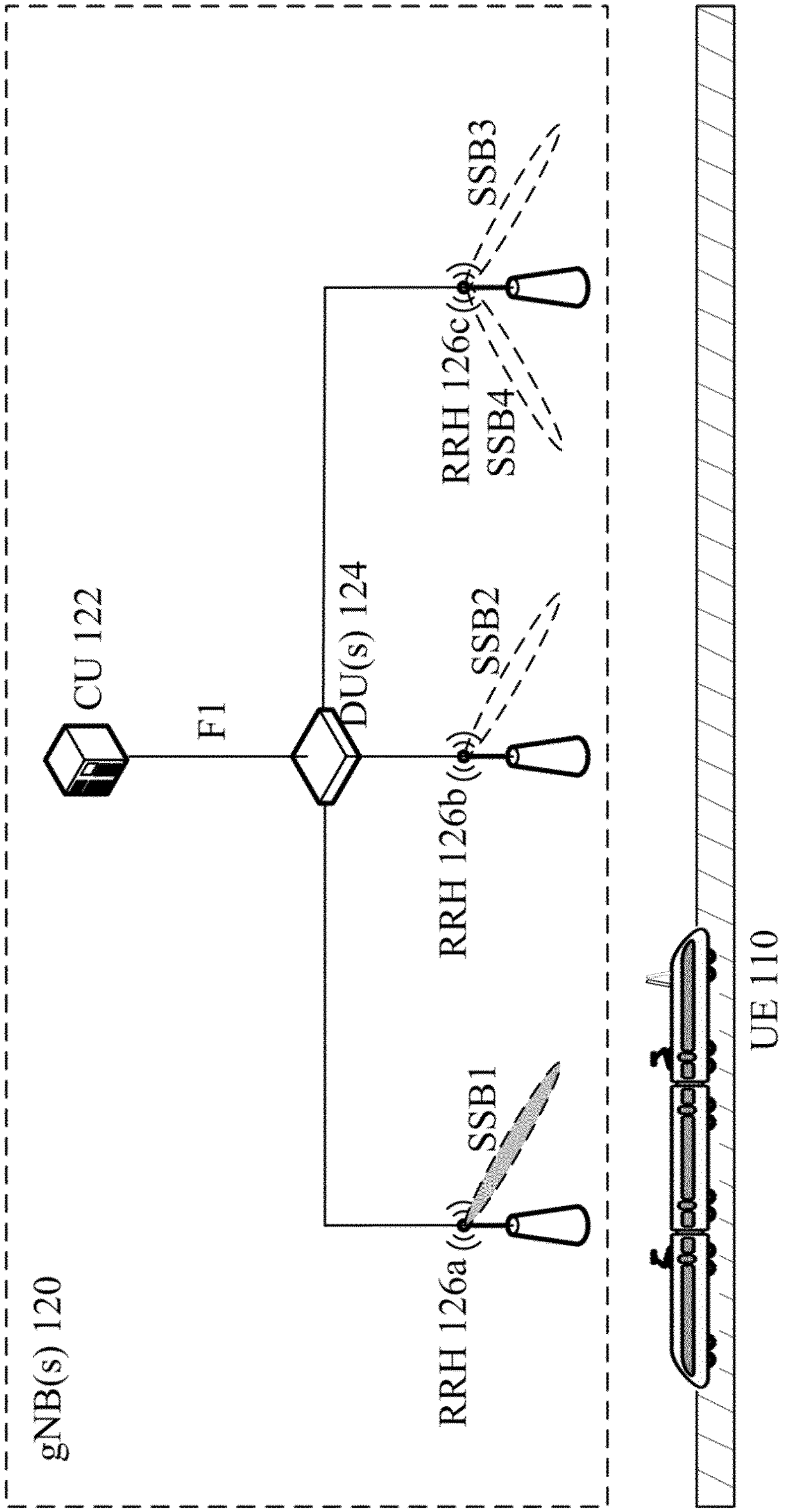
FIG. 1 is a schematic diagram illustrating a communication system in which one or more example embodiments of the present disclosure may be implemented.

FIG. 1 illustrates a communication system 100 in which example embodiments of the present disclosure may be implemented. The communication system 100 may be a multiple access system capable of supporting communication with multiple users sharing available system resources. The communication system 100 may employ one or more channel access schemes such as Time Division Multiple Access (TDMA), Code Division Multiple Access (CDMA), Time Division Synchronous Code Division Multiple Access (TD-SCDMA), Frequency Division Multiple Access (FDMA), Orthogonal Frequency Division Multiple Access (OFDMA), Single Carrier Frequency Division Multiple Access (SC-FDMA) and the like. These multiple access schemes may be formulated in 4G Long Term Evolution (LTE), 5G New Radio (NR), or beyond 5G radio standards. For convenience of description, FIG. 1 shows the communication system 100 as a 5G NR system, but it would be appreciated that example embodiments disclosed herein can also be implemented in a 4G LTE system or a future communication system.

Referring to FIG. 1, the communication system 100 may include one or more base stations 120. In the example embodiment, the base station(s) 120 are shown as a 5G base station named gNB including a centralized unit (CU) 122 and one or more distributed units (DUs) 124. Multiple base stations 120 may share the CU 122, while each base station 120 may include one DU 124. The CU 122 and the DU 124 of a base station may be deployed together in an integration architecture or separate from each other in a cloud/centralized architecture. The multiple DUs 124 may be deployed as a DU pool at a same position or at different positions such as at cell sites. The CU 122 may connect to the one or more DUs 124 via a F1 interface, and the DU 124 may connect to one or more remote radio heads (RRHs) 126 via an optical interface known as Common Public Radio Interface (CPRI). It would be appreciated that the base station 120 may also be implemented as a 4G base station named eNB where the RRHs 126 are connected to a baseband unit (BBU), or as a beyond 5G base station. In some example embodiments, the RRHs 126 may also be referred to as or implemented as transmission points (TPs), transmission-reception points (TRPs), radio units (RUs), remote radio units (RRUs), active antenna units (AAUs) and the like. In the present disclosure, the term "access point" may be used to represent any one of the RRH, the TP, the TRP, the RU, the RRU, and the AAU. In some example embodiments, the term "access point" may also be used to represent a base station such as a macro base station, a micro base station, a pico base station or a femto base station.

As an example, FIG. 1 shows three RRHs **126*a*, 126*b*, 126*c* located separate from each other. For example, in a high speed train (HST) scenario, the RRHs 126*a*, 126*b* and 126*c* may be located along a railway track with a predetermined distance between two adjacent RRHs for a better cell coverage. The RRHs 126*a*, 126*b* and 126*c* may connect to one DU 124, i.e. belong to one base station, and serve for one cell. The RRHs 126 may apply beamforming to transmit one or more beams towards user equipment (UE) 110 such as customer premises equipment (CPE) mounted on the top of a train carriage or mobile phones held by customers in the train carriage. For example, the RRHs 126 may transmit in a uni-directional manner along the track as shown by the RRHs 126*a*, 126*b* or in a bi-directional manner along the track as shown by the RRH 126*c*. Though the HST scenario is discussed here as an example, it would be appreciated that example embodiments discussed below may also be implemented in other application scenarios. For example, in some example embodiments, the RRHs 126*a*, 126*b* and 126*c* may connect to one DU 124 but serve for different cells. In some example embodiment, the RRHs 126*a*, 126*b* and 126*c* may connect to different DUs 124 in different base stations 120**.

As discussed above, the RRHs 126 transmit one or more downlink (DL) beams, which of the DL beams the UE 110 is required to use is controlled by the network based on UE-assisted measurements and reporting. The network configures the UE 110 with one or more reference signals (RSs) to measure the beams, which may be synchronization signal block (SSB) (as shown in FIG. 1), channel state information RS (CSI-RS) (not shown) or both. Then the UE 110 reports the measurements to the network. Based on the measurement results, the network can command the UE 110 which DL RS to use for DL reception (i.e., which DL beam is to be monitored by the UE 110 for DL reception). This procedure is also known as beam management (BM). 3GPP has developed the concept of BM to enable fast and efficient change of the DL beam used by the UE.

However, the current BM concept is based on an assumption that the transmission points for all the DL beams used in a serving cell are collocated, seen from UE point of view. Hence, transmissions from the cell are from the same point in the space, seen from the UE. The UE uses this assumption to direct its Rx beam settings correctly. When the RRHs from one serving cell are located in physically different positions, e.g. in the HST scenario shown in FIG. 1, transmissions from the cell are from different points in the space from the UE point of view, and new challenges arise.

Figure 2:
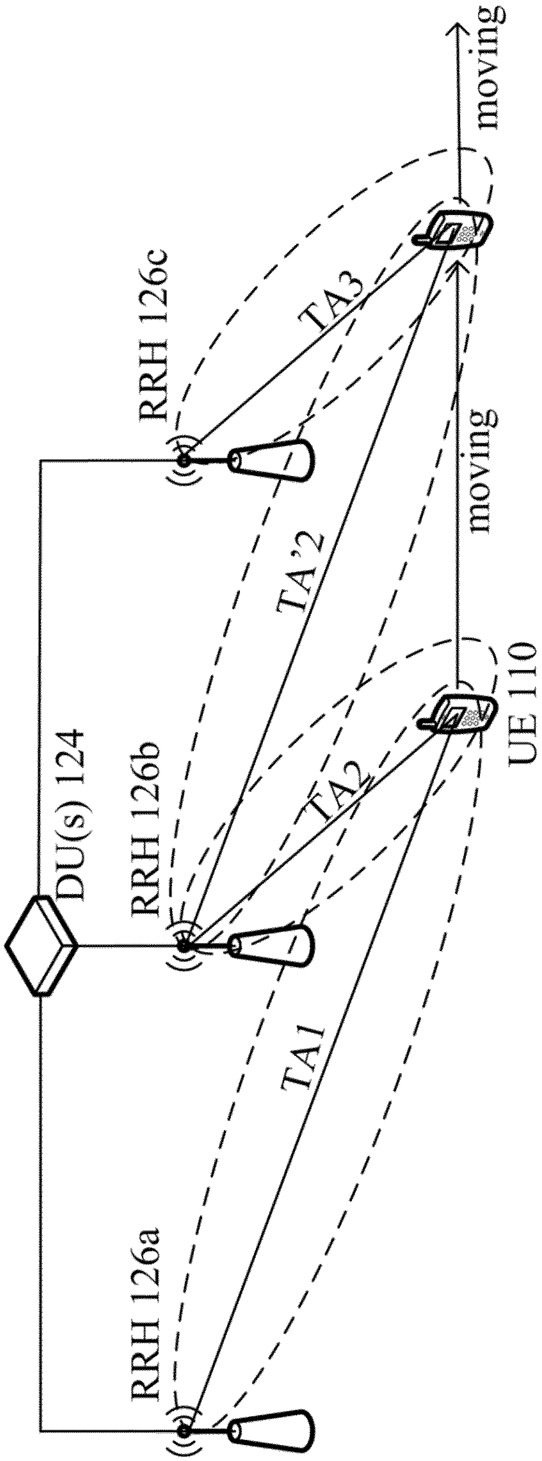
FIG. 2 is a schematic diagram illustrating change in propagation delay and timing advance while user equipment (UE) is moving.

One such challenge is that in uplink (UL), the basic assumption that UL synchronization and timing advance (TA) used at the UE does not change at the time of beam change (due to the transmission points collocation assumption), is not always true. Referring to FIG. 2, when the UE 110 switches from the first RRH **126*a* to the second RRH 126*b*, the proper TA for the UE 110 would also change from a first value TA1 that corresponds to a DL propagation delay PD1 from the first RRH 126*a* to the UE 110 to a second value TA2 that corresponds to a DL propagation delay PD2 from the second RRH 126*b* to the UE 110. Assuming a distance of 700 m between the RRHs 126*a* and 126*b*, the DL propagation delay difference dPD (dPD=PD2−PD1) would be around 2.3 μs, which is almost five times more than the cyclic prefix (CP) length of 0.57 μs at 120 kHz sub-carrier spacing (SCS) in FR2. The change of the proper TA would also occur from TA'2 to TA3 when the UE 110 moves on and switches from the RRH 126*b* to the RRH 126*c*. As such, the UL synchronization/TA cannot be re-used when the UE 110** switches between the RRHs that are located in different positions.

In the current networks, the UL TA is controlled by the network. However, the target RRH **126*b* cannot measure the UL signals from the UE 110, and consequently the propagation delay, before the beam change. On the other hand, if the wrong TA is used after the beam change, the UL signals could be out of the evaluation window at the base station 120**. Moreover, the wrong UL timing could result in significant degradation or complete loss of data transmissions.

Figure 3:
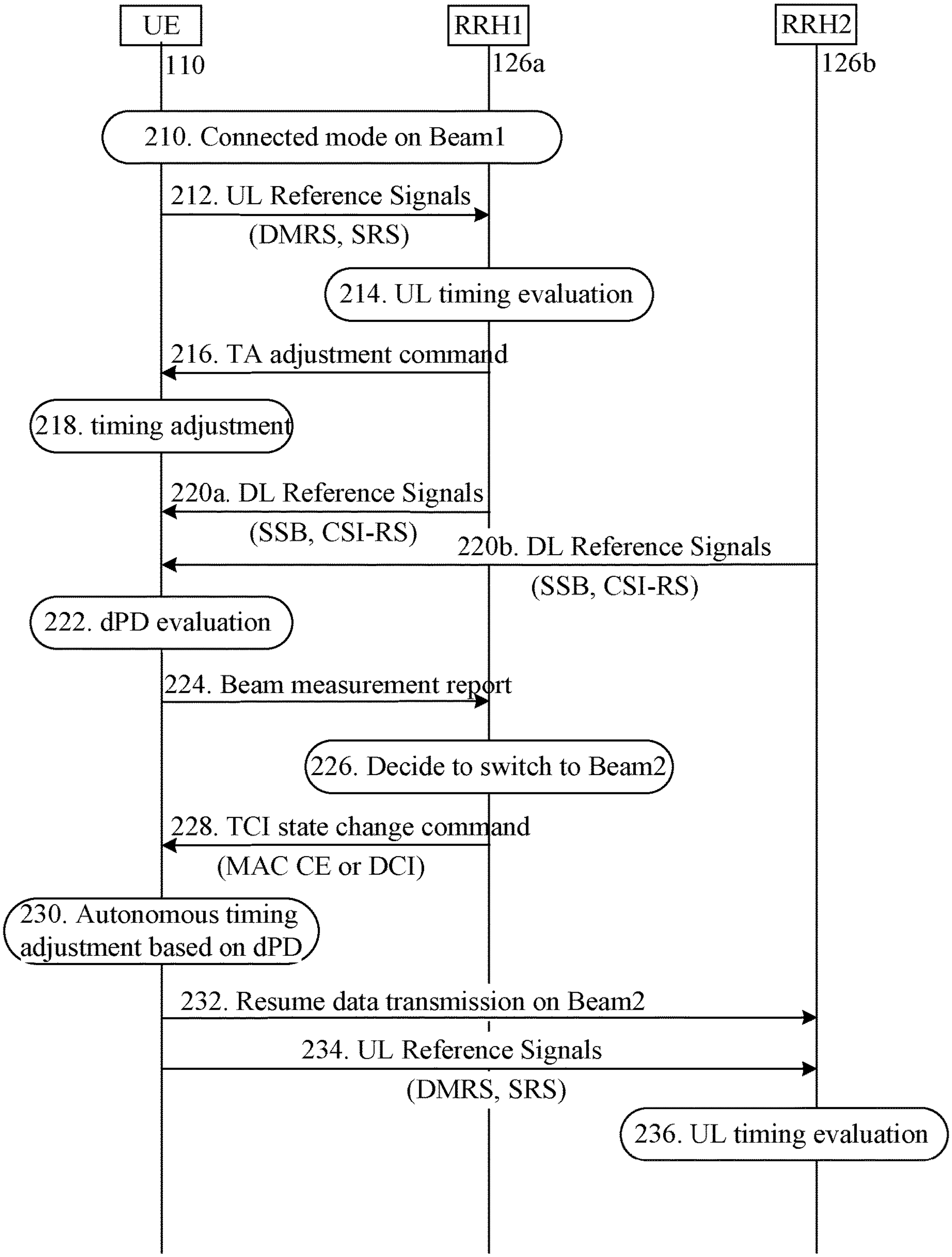
FIG. 3 is a message diagram illustrating network controlled timing adjustment and UE autonomous timing adjustment at beam change.

One possible solution is to perform autonomous timing adjustment at the UE 110 based on measurements of DL signals received from the source and target RRHs, an example of which is shown in FIG. 3. Referring to FIG. 3, it is assumed that the UE 110 is connected to the first RRH **126*a* on a first beam Beam1 at an operation 210. The UE 110 can obtain an initial valid TA during a random access (RA) procedure to establish the RRC connection with the RRH 126*a* (i.e., the base station 120). For example, the UE 110 may transmit a RA preamble to the RRH 126*a*** in a first message (Msg1 in a 4-step RA procedure or MsgA in a 2-step RA procedure) and obtain the TA in a second message (Msg2 in the 4-step RA procedure or (MsgB in the 2-step RA procedure).

At 212, the RRH **126*a* may monitor UL reference signals such as a demodulation reference signal (DMRS) and/or a sounding reference signal (SRS) from the UE 110. The UE 110 transmits the UL signals based on the current TA so that the RRH 126*a* can receive the UL signals within in a given window. At 214, the base station 120 evaluates UL timing of the UE 110 based on the UL signals received from the UE 110. If the UL signals are received in the reception window, the RRH 126*a* determines that the current TA is still valid for the UE 110. If the UL signals are not seen by the network as being adequately within the reception window e.g., at least partially out of the reception window, for example due to propagation delay change resulting from UE movement, or for any other reason decided by the network, the RRH 126*a* may decide that the current TA for the UE 110 needs to be adjusted. Then at 216 the RRH 126*a* sends a TA adjustment command (TAC) to the UE 110 to adjust the TA for the UE 110. The TAC indicates an amount of adjustment relative to the current TA applied to the UE 110. Accordingly, the UE 110 can update its uplink timing based on the adjusted TA (adjusted by adding the amount of adjustment to the current TA) at 218**.

At 220, the UE 110 may receive DL RSs from RRHs including the serving RRH **126*a* and one or more neighboring/non-serving RRHs such as the RRH 126*b*. The network may configure the UE 110 with a set of reference signals to monitor quality or signal strength of certain reference signals (RSS) e.g., representing DL radio beams for the beam management purpose. The set of reference signals may include a list of synchronization signal block (SSB) and/or channel state information reference signal (CSI-RS) resources. At the operation 220, the UE 110 may periodically receive the DL RSs from the RRHs 126*a*, 126*b*, 126*c*. At 222, the UE 110 may evaluate DL propagation delay values from the RRHs 126*a*, 126*b* to the UE 110 based on the received DL RSs and obtain a DL propagation delay difference (dPD) between the RRH 126*a* and the RRH 126*b*. The dPD between the RRH 126*a* and the RRH 126*b* is in proportionality with a difference between a distance from the RRH 126*a* to the UE 110 and a distance from the RRH 126*b* to the UE 110. It would be appreciated that the UE 110 may evaluate more than one dPD values between the serving RRH 126*a* and more than one neighboring RRHs in the operation 222**.

At 224, the UE 110 may assess quality of the beams based on e.g. L1-RSRP of the received DL RSs and send a beam management related measurement report to the RRH **126*a*. The beam measurement report may include one or more strongest beam measurements. The UE 110 may send the measurement report periodically or when one or more neighboring/non-serving beams are better than the serving beam or a predetermined threshold level or when the serving beam has a quality worse than a predetermined threshold level. Assuming that the base station 120 determines from the measurement report that the second beam Beam2 of the RRH 126*b* is (offset) better than the first beam Beam1 of the RRH 126*a*, the base station 120 may decide at 226 to switch the UE 110 from the first beam Beam1 of the RRH 126*a* to the second beam Beam2 of the RRH 126*b*. Then the RRH 126*a* sends a transmission configuration indicator (TCI) state change command to the UE 110 at 228. The TCI state change command may include e.g. a serving cell ID, a TCI state ID and a control resource set (CORESET) ID associated with a target beam, i.e., the second beam Beam2 of the RRH 126***b*. The TCI state change command may be carried in downlink control information (DCI) transmitted on the physical downlink control channel (PDCCH) or in a medium access control (MAC) control element (CE).

In response to the TCI state change command received from the base station 120, the UE 110 may switch from the first beam Beam1 of the RRH 126*a* to the second beam Beam2 of the RRH 126*b*. Although beam switching by the beam management procedure is discussed here, it would be appreciated that the UE 110 may also perform autonomous beam change. For example, when the UE 110 finds a better beam by measuring available beams, the UE 110 may autonomously decide to switch to the better beam and inform the network of the autonomous beam switching.

The UE 110 may perform at 230 autonomous timing adjustment based on the propagation delay difference dPD between the source RRH 126*a* and the target RRH 126*b*, which is also called as a one-shot large autonomous TA adjustment, so that a UL transmission from the UE 110 will, when it is received at the target RRH 126*b*, align to the DL timing at the base station 120. The propagation delay difference dPD between the source RRH 126*a* and the target RRH 126*b* was already evaluated by the UE 110 at the operation 222. For example, referring to FIG. 2, when the UE 110 switches from the source RRH 126*a* and the target RRH 126*b*, the UE 110 autonomously adjust its TA from TA1 for the RRH 126*a* to TA2 for the RRH 126*b* according to Equation 1 where PD1 is the propagation delay from the source RRH 126*a* to the UE 110 and PD2 is the propagation delay from the target RRH 126*b* to the UE 110.

$$TA2-TA1+2*(PD2-PD1)=TA1+2*dPD \quad \text{(Equation 1)}$$

With the autonomous TA, the UE 110 can resume at 232 UL data transmission on the new beam to the RRH 126*b* after the beam switch. Similar to the operations 212 and 214, the UE 110 may transmit UL RSs such as DMRS and/or SRS to the RRH 126*b* at 234, and the base station 120 may evaluate UL timing of the UE 110 based on the UL signals received from the UE 110 at 236. However, it should be noted that the TA for the UE 110 maintained at the base station 120 is still the value TA1 before the UE autonomous TA adjustment, not the UE autonomous TA value TA2. As mentioned above with reference to the operations 214 and 216, the base station 120 determines an amount of adjustment relative to the current TA (TA1) for the UE 110, not an absolute value of the TA. Therefore, the TA value for the UE 110 maintained at the base station 120 would be misaligned with the TA value maintained at the UE 110.

Figure 4:
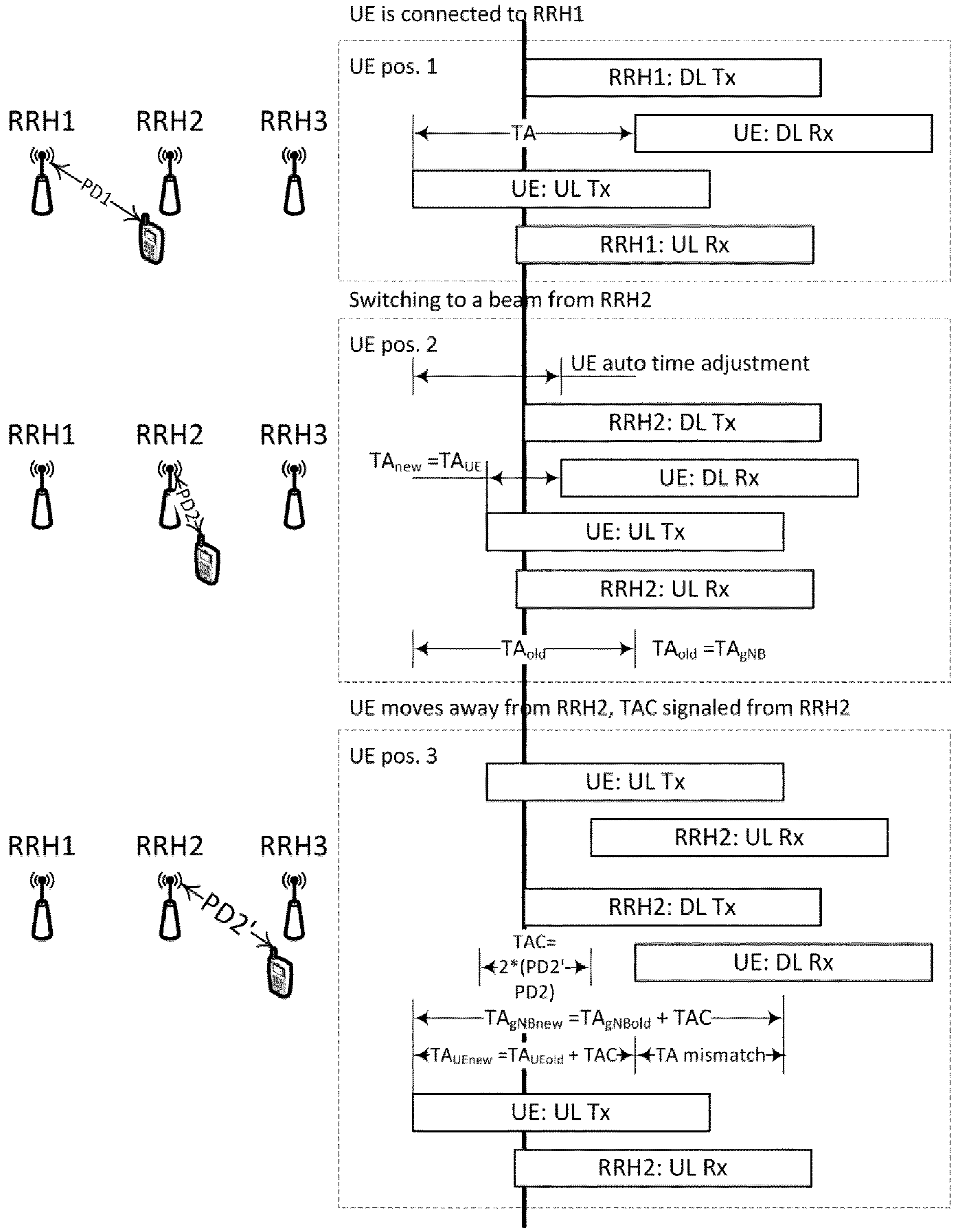
FIG. 4 is a schematic diagram illustrating TA misalignment between UE and the network due to the UE autonomous timing adjustment at beam change.

The misalignment of the TA between the UE 110 and the base station 120 would also accumulate as the UE 110 moves along the railway track and switches to subsequent RRHs such as the RRH 126*c*. FIG. 4 shows such a process. Referring to FIG. 4, it is assumed that at the beginning, the UE 110 is located at a first position and connected to the first RRH 126*a*. Both the TA maintained at the UE 110 and the TA maintained at the base station 120 for the UE 110 have a same value, which corresponds to a propagation delay PD1 between the first RRH 126*a* and the UE 110 so that the UL transmission from the UE 110 will align to the DL timing of the RRH 126*a* when the UL transmission is received at the RRH 126*a*. It would be understood that the TA represents a timing difference from the UL timing at the UE to the DL timing at the UE, and the propagation delay PD represents a timing difference from the UL transmission at the UE to the reception of the UL transmission at the RRH.

When the UE 110 moves to a second position and switches from the first RRH 126*a* to the second RRH 126*b*, the propagation delay between the RRH 126*b* and the UE 110 becomes PD2, which is different from the propagation delay PD1 between the RRH 126*a* and the UE 110. The UE 110 performs autonomous TA adjustment as in the operation 230 in FIG. 3, and the TA value maintained at the UE becomes $TA_{UE}=TA_{new}$ so that the UL transmission of the UE 110 can still align to the DL timing of the second RRH 126*b* when it is received at the second RRH 126*b*. At this point of time, the TA value maintained at the base station 120 for the UE 110 still has a value before the UE autonomous TA adjustment, i.e., $TA_{gNB}-TA_{old}$. There is a difference between the TA value maintained at the UE 110 and the TA value maintained at the base station 120.

As the UE 110 moves away from the RRH 126*b* to a third position, the propagation delay between the RRH 126*b* to the UE 110 becomes PD2' which is larger than the value PD2 when the UE 110 is at the second position. The base station 120 measures UL RSs such as DMRS and/or SRS as in the operation 212 (FIG. 3), evaluates the UL timing of the UE 110 as in the operation 214 (FIG. 3), and recognizes that there is a need for updating the UE TA. Then the base station updates the TA value maintained at the UE 110 by transmitting a TA adjustment command (TAC) as in the operation 216 (FIG. 3). As mentioned above, the TAC indicates an adjustment amount TAC=2*(PD2'−PD2) relative to the current/old TA. Then, the TA value maintained at the base station 120 for the UE 110 becomes $TA_{gNBnew}-TA_{gNBold}+TAC$, and the TA value maintained at the UE 110 becomes $TA_{UEnew}-TA_{UEold}+TAC$. There is still a TA mismatch between the TA value at the UE side and the TA value for the UE maintained at the network side.

It can be understood from the process shown in FIG. 4 that as the UE 110 moves along the railway track, switches to subsequent RRHs and performs autonomous TA adjustment for more times, the misalignment of the TA value between the UE 110 and the network will increase to a larger value. If the wrong TA value on the network side is used in other procedures or signaled to the UE 110, unexpected situation may arise.

Hereinafter, some example embodiments of devices and methods to ensure TA alignment between UE and the network will be discussed in detail with reference to the accompanying drawings. The example embodiments can minimize or eliminate TA misalignment between the UE and the network without incurring significant signaling overhead increase. Although the HST scenario and the beam management are discussed above to introduce relevant arts, it would be appreciated that the example embodiments may also be applied in other scenarios to both the beam switch by beam management and the UE autonomous beam change.

Figure 5:
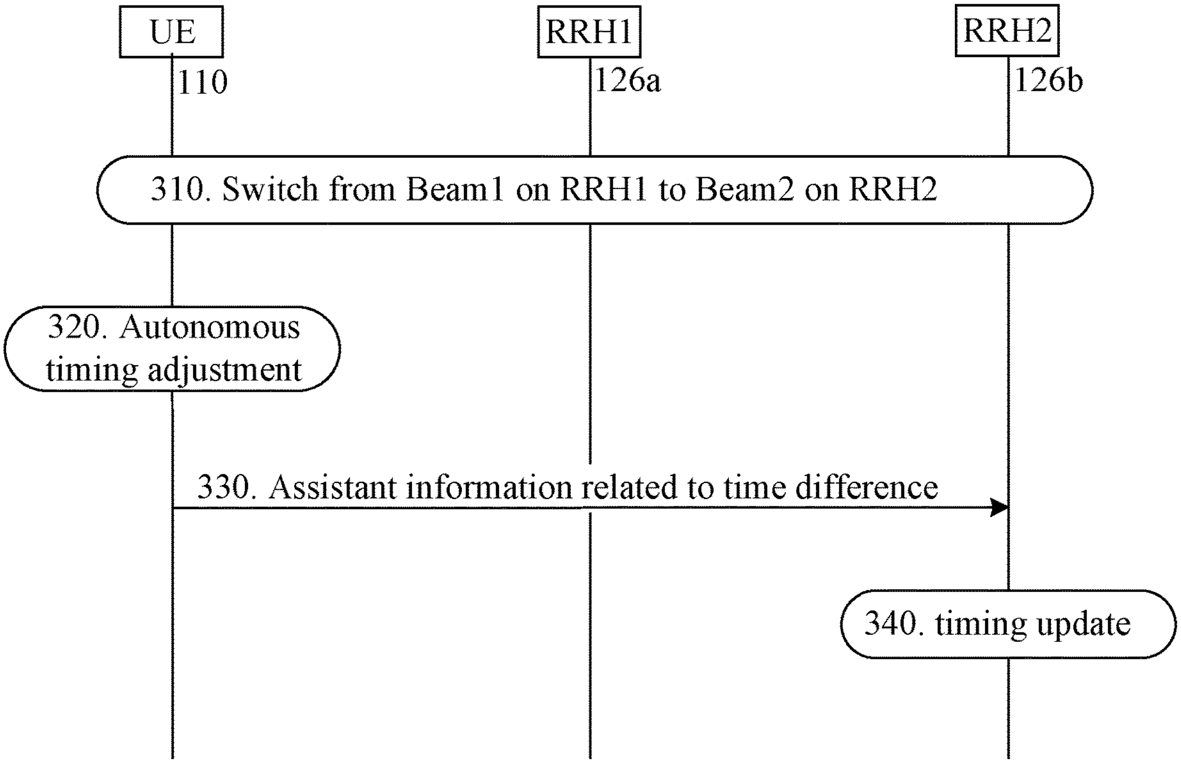
FIG. 5 is a high level message diagram illustrating a procedure for TA alignment between UE and the network in accordance with some example embodiments.

FIG. 5 is a high level message diagram illustrating a procedure for TA alignment between UE and the network in accordance with some example embodiments. The procedure shown in FIG. 5 may be performed by UE and one or more base station, for example the UE 110 and the base station(s) 120 described above with reference to FIG. 1. In some example embodiments, the UE 110 and the base station(s) 120 may include a plurality of means, modules or elements for performing operations discussed below with reference to FIG. 5. The means, modules and elements may be implemented in various manners including but not limited to for example software, hardware, firmware or any combination thereof to perform the operations. For convenience of description, FIG. 5 shows two RRHs 126*a*, 126*b*, it would be appreciated that the two RRHs 126*a*, 126*b* may belong to the same or different base stations. When the two RRHs 126_a_, 126_b_ belong to the same base station 120, the two RRHs 126_a_, 126_b_ may serve for the same or different cells.

Referring to FIG. 5, at 310, the UE 110 may switch from a first beam Beam1 operated by the first RRH 126_a_ to a second beam Beam2 operated by the second RRH 126_b_. As discussed above, the UE 110 may perform beam switching in response to a TCI state change command received from the base station 120. In some example embodiments, the UE 110 may perform autonomous Rx beam switching for example when the UE 110 finds a candidate Rx beam better than the serving Rx beam.

At 320, the UE 110 may perform autonomous timing adjustment based on a timing difference between the first RRH 126_a_ and the second RRH 126_b_. In some example embodiment, the propagation delay difference dPD between the first RRH 126_a_ and the second RRH 126_b_ may be used as an example of the timing difference, based on which the UE 110 may autonomously adjust its uplink timing so that UL transmission, when it is received at the RRH 126_b_, will align to the DL timing at the RRH 126_b_. As discussed above, the UE 110 can get in DL synchronization with the first RRH 126_a_ and the second RRH 126_b_ by receiving DL RSs such as SSB and/or CSI-RS and evaluate the propagation delay difference dPD between the first RRH 126_a_ and the second RRH 126_b_.

Then the UE 110 may transmit assistant information related to the timing difference to the second RRH 126_b_ for the TA alignment purpose at 330. In some example embodiment, the assistance information may be requested by the network e.g. after beam switch has been performed (not illustrated in the figure). Based on the assistant information related to the timing difference, the base station 120 can update the TA value for the UE 110 so as to align with the TA maintained at the UE 110. Although FIG. 5 shows that the assistant information is sent from the UE 110 to the RRH 126_b_, it would be appreciated that the UE 110 may also send the assistant information via an intermediate entity to the RRH 126_b_ (or the base station associated with the RRH 126_b_). Some examples of the operations 330, 340 will be discussed below in detail, but the present disclosure is not limited to the examples disclosed herein.

FIGS. 6-7 and 9-10 illustrate example operations to perform the procedure of FIG. 5 in accordance with some example embodiments. In FIGS. 6-7 and 9-10, similar or same operations are denoted with similar or same numerals and repetitive description thereof would be omitted. In the procedures shown in FIGS. 6-7 and 9-10, the two RRHs 126_a_, 126_b_ may be included in the same base station 120, unless described otherwise.

Figure 6:
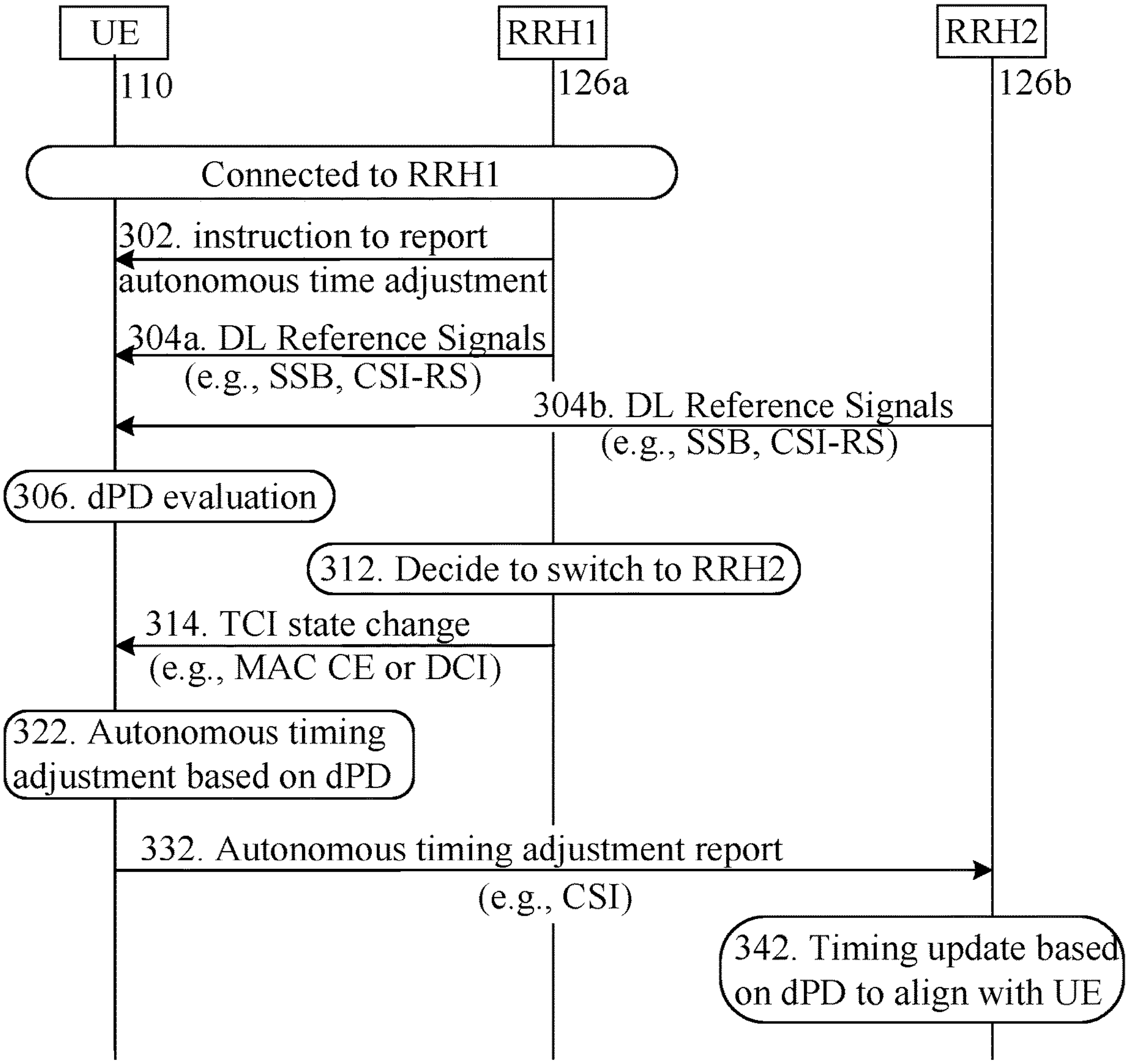
FIG. 6 is a message diagram illustrating a procedure for TA alignment between UE and the network in accordance with some example embodiments.

Referring to FIG. 6, at the beginning, the UE 110 is supposed to be connected to the first RRH 126_a_. At 302, the UE 110 may receive an instruction to report autonomous timing adjustment from the base station 120. In some example embodiments, the base station 120 may transmit the instruction via RRC signaling, downlink control information (DCI) on the physical downlink control channel (PDCCH), or a medium access control (MAC) control element (CE). In some example embodiments, the UE 110 may proactively report the autonomous timing adjustment to the base station 120, and the operation 302 may be omitted.

The UE 110 may receive DL RSs such as SSB and CSI-RS from the RRHs 126_a_, 126_b_ at 304 and evaluate a propagation delay difference dPD between the RRHs 126_a_ and 126_b_ at 306.

When the base station 120 decides at 312 to switch the UE 110 from the first RRH 126_a_ to the second RRH 126_b_ e.g., based on a beam measurement report received from the UE 110, the base station 120 may transmit a TCI state change command to the UE 110 e.g., via DCI on PDCCH or via MAC CE at 314. The TCI state change command may comprise a TCI state ID and a control resource set (CORESET) ID associated with the second beam Beam2 of the second RRH 126_b_. The TCI state includes information of one or more DL RSs and quasi co-located (QCL) type associated with the respective DL RSs. Then the UE 110 may replace the first beam Beam1 of the first RRH 126_a_ with the second beam Beam2 of the second RRH 126_b_ by activating the new TCI state indicated in the TCI state change command. In some example embodiments where the RRH 126_b_ serves a cell different from the cell served by the RRH 126_b_, the TCI state change command may further comprise a cell ID indicating the new cell for the beam switching.

In some example embodiments, the TCI state change command transmitted in the operation 314 may carry the instruction to report autonomous TA adjustment, and the operation 302 may be omitted. For example, a special CORESET ID or TCI state ID may be defined/reserved to indicate that the UE 110 is instructed to report the autonomous TA adjustment.

In some example embodiments, the UE 110 may perform autonomous beam switching based on for example beam measurements, and the operations 312, 314 may be omitted.

As discussed above, in some example embodiments, the RRHs 126_a_, 126_b_ may belong to different base stations. In such a case, the source base station including the RRH 126_a_ may indicate to the target base station including the RRH 126_b_ that the UE 110 will switch to a beam operated by the RRH 126_b_ and further send UE context information via an Xn interface to the target base station. The UE context may include information such as UE TA maintained at the network side. In some example embodiments, instead of the operation 302, the RRH 126_b_ may instruct the UE 110 to report autonomous timing adjustment when it receives the indication of beam switching for the UE 110.

At 322, the UE 110 may perform autonomous timing adjustment based on e.g. the propagation delay difference dPD between the first RRH 126_a_ and the second RRH 126_b_ obtained in the operation 306. Then the UE 110 can send UL transmissions to the second RRH 126_b_ using the autonomous TA.

As the autonomous TA at the UE 110 may be different from the TA maintained at the base station 120 for the UE 110, the UE 110 may report the autonomous timing adjustment to the second RRH 126_b_ at 332. The autonomous timing adjustment report may indicate an amount (dPD) of the adjustment relative to the old timing (TA) as the assistant information for the TA alignment to the base station 120. In some example embodiments, the UE 110 may use a CSI report to send the amount of the autonomous timing adjustment.

Then at 342, the base station 120 may update the TA value for the UE 110 based on the amount of the autonomous timing adjustment performed at the UE 110. By the operation 342, the TA maintained at the base station 120 for the UE 110 may be aligned to the autonomous TA at the UE 110. In subsequent operations, the base station 120 may periodically monitor UL RSs such as DMRS and/or SRS from the UE 110 and update the TA at the UE 110 by the TA adjustment command if needed.

In the procedure shown in FIG. 6, the UE 110 sends the amount of the autonomous timing (TA) adjustment to the network so that the network can update the TA for the UE 110 directly based on the amount of the adjustment performed at the UE 110. In some example embodiments, the base station 120 can perform TA alignment without knowledge of the amount of the autonomous TA adjustment at the UE 110, an example of which is shown in FIG. 7.

Figure 7:
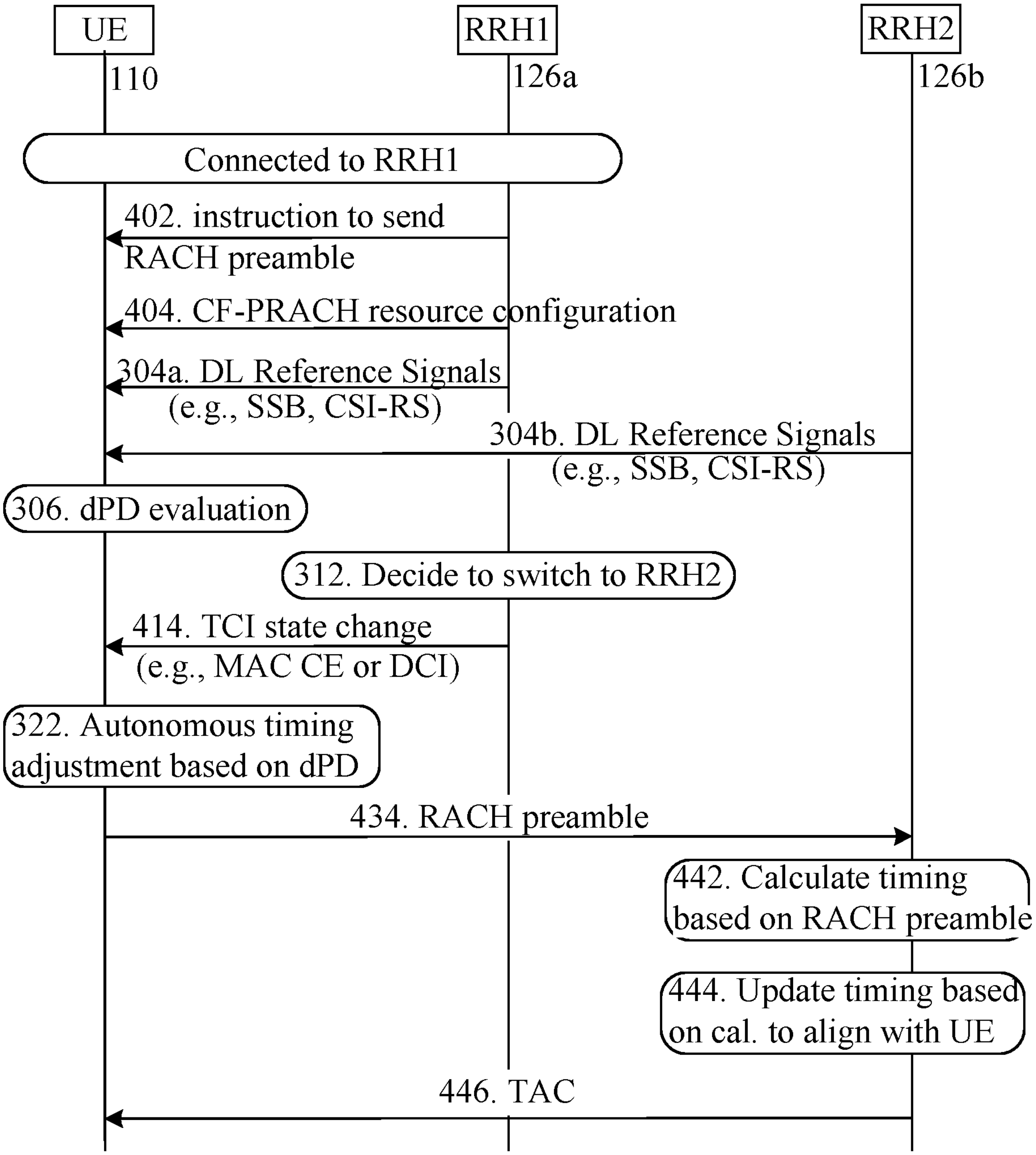
FIG. 7 is a message diagram illustrating a procedure for TA alignment between UE and the network in accordance with some example embodiments.

Referring to FIG. 7, at 402, the UE 110 may receive an instruction to transmit a random access (RA) preamble whenever a UE autonomous TA adjustment is made based on a propagation delay difference (i.e., the one-shot large autonomous TA adjustment). In some example embodiments, the base station 120 may transmit the instruction via RRC signaling, DCI on the PDCCH channel, or a MAC CE. In some example embodiments, the UE 110 may proactively transmit the RA preamble whenever the autonomous TA adjustment is made, and the operation 402 may be omitted.

At 404, the base station 120 may configure RA resources for the UE 110. For example, the base station 120 may allocate a dedicated (contention free) preamble for the UE 110 via RRC signaling e.g. ra-PreambleIndex or DCI on the PDCCH. For example, when there are not many UEs in a cell, the network can allocate dedicated preambles for the UEs. The base station 120 can identify the UE 110 when it receives the dedicated preamble allocated to the UE 110. If there are many UEs in a cell and the base station 120 cannot allocate a dedicated preamble for a UE, the UE can select a preamble from a set of common (contention-based) preambles, and the operation 404 may be omitted. In some example embodiments, the base station 120 may also allocate dedicated UL resources for the UE 110 to transmit a contention based or contention free preamble in the operation 404.

The UE 110 may receive DL RSs such as SSB and CSI-RS from the RRHs 126*a*, 126*b* at 304 and evaluate a propagation delay difference dPD between the RRHs 126*a* and 126*b* at 306. When the base station 120 decides to switch the UE 110 from the RRH 126*a* to the RRH 126*b* e.g. based on a measurement report at 312, the base station 120 may transmit a TCI state change command to the UE 110 via DCI MAC CE at 414. In response to the TCI state change command, the UE 110 may switch to RRH 126*b* by activating the new TCI state indicated in the command.

In some example embodiments, the TCI state change command transmitted in the operation 414 may carry the instruction to transmit the RA preamble upon the autonomous TA adjustment, and the operation 402 may be omitted. For example, the TCI state change command may include a special CORESET ID or TCI state ID that is defined/reserved to indicate the instructed of transmitting the RA preamble.

In some example embodiments, the UE 110 may perform autonomous beam switching based on for example beam measurements, and the operations 312, 414 may be omitted.

In some example embodiments where the RRHs 126*a*, 126*b* belong to different base stations, the source base station including the RRH 126*a* may indicate to the target base station including the RRH 126*b* that the UE 110 will switch to a beam operated by the RRH 126*b* and further send UE context information via an Xn interface to the target base station. The UE context may include information such as UE TA maintained at the network side. In some example embodiments, instead of the operations 402 and 404, the RRH 126*b* may instruct the UE 110 to send RA preamble and allocate resources for transmission of the RA preamble when it receives the indication of beam switching for the UE 110.

At 322, the UE 110 may perform autonomous timing adjustment based on the timing difference e.g. the propagation delay difference dPD between the first RRH 126*a* and the second RRH 126*b* obtained in the operation 306. Then the UE 110 can send UL transmissions to the second RRH 126*b* using the autonomous TA.

At 434, the UE 110 may transmit a random access RA preamble to the second RRH 126*b*. If the UE 110 has been allocated with a dedicated (contention-free) preamble at the operation 404, the UE 110 may use the allocated dedicated preamble in the operation 434. If the base station 120 does not allocate a dedicated preamble to the UE 110, the UE 110 may transmit a contention-based preamble to the base station 120. In some example embodiments, the UE 110 may transmit the RA preamble on a physical random access channel (PRACH) or using dedicated UL resources allocated e.g. in the operation 404.

Figure 8A:
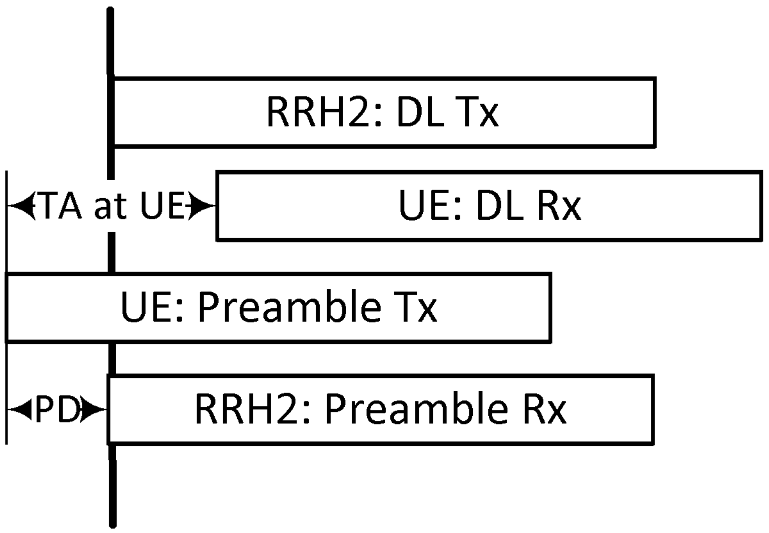
FIG. 8A is a schematic diagram illustrating TA calculation based on a random access preamble reception at a base station.
Figure 8B:
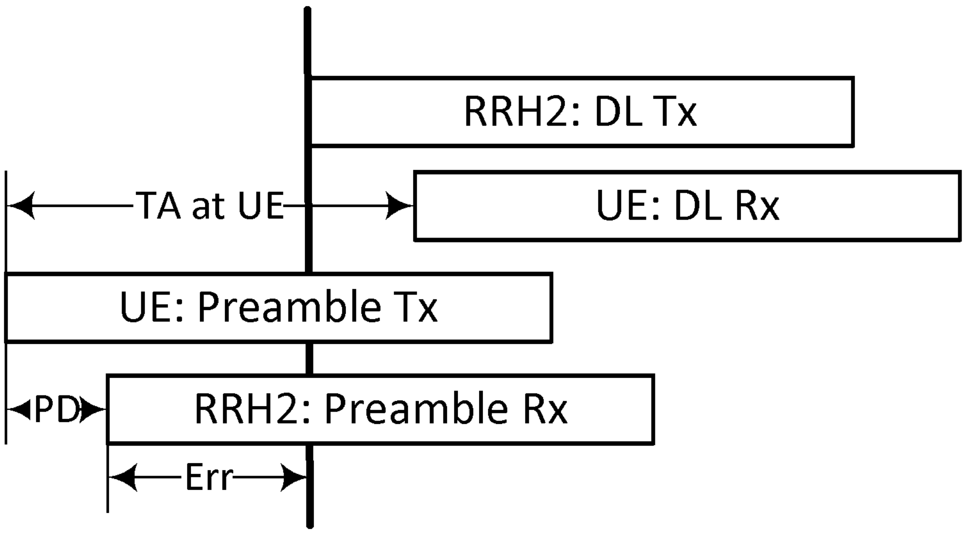
FIG. 8B is a schematic diagram illustrating determination of an error in UE autonomous TA based on a random access preamble reception at a base station.

Then at 442, the base station 120 may calculate UE UL timing e.g. a valid TA value based on the received preamble. FIGS. 8A-8B shows how the valid TA may be calculated. Referring to FIG. 8A, the base station 120 may calculate the propagation delay PD of the preamble and determine the valid TA for the UE 110 based on the propagation delay PD. If the reception timing of the preamble aligns to the DL timing at the base station 120 as shown in FIG. 8A, the base station 120 can determine that the TA used at the UE 110 (the autonomous TA) aligns to the calculated valid TA. As the UE 110 made the autonomous TA adjustment based on the propagation delay from the RRH 126*b* to the UE 110, generally it can be expected that the autonomous TA at the UE 110 would align to the calculated valid TA. In some cases, however, the reception timing of the preamble may not align to the DL timing at the base station 120, as shown in FIG. 8B. The base station 120 can determine that the autonomous TA at the UE 110 has an error relative to the calculated valid TA, and the error equals to the difference between the reception timing of the preamble and the DL timing at the base station 120.

Referring back to FIG. 7, at 444, the base station 120 may update the timing (TA) for the UE 110 using the calculated valid TA value to align to the autonomous TA at the UE 110. If the base station 120 determines that the autonomous TA at the UE 110 has an error relative to the calculated valid TA, the base station 120 may also send a TA adjustment command (TAC) to the UE 110 at 446 to remove the error. When the error is removed, UL transmissions from the UE 110 would align to the DL timing at the base station 120.

Figure 9:
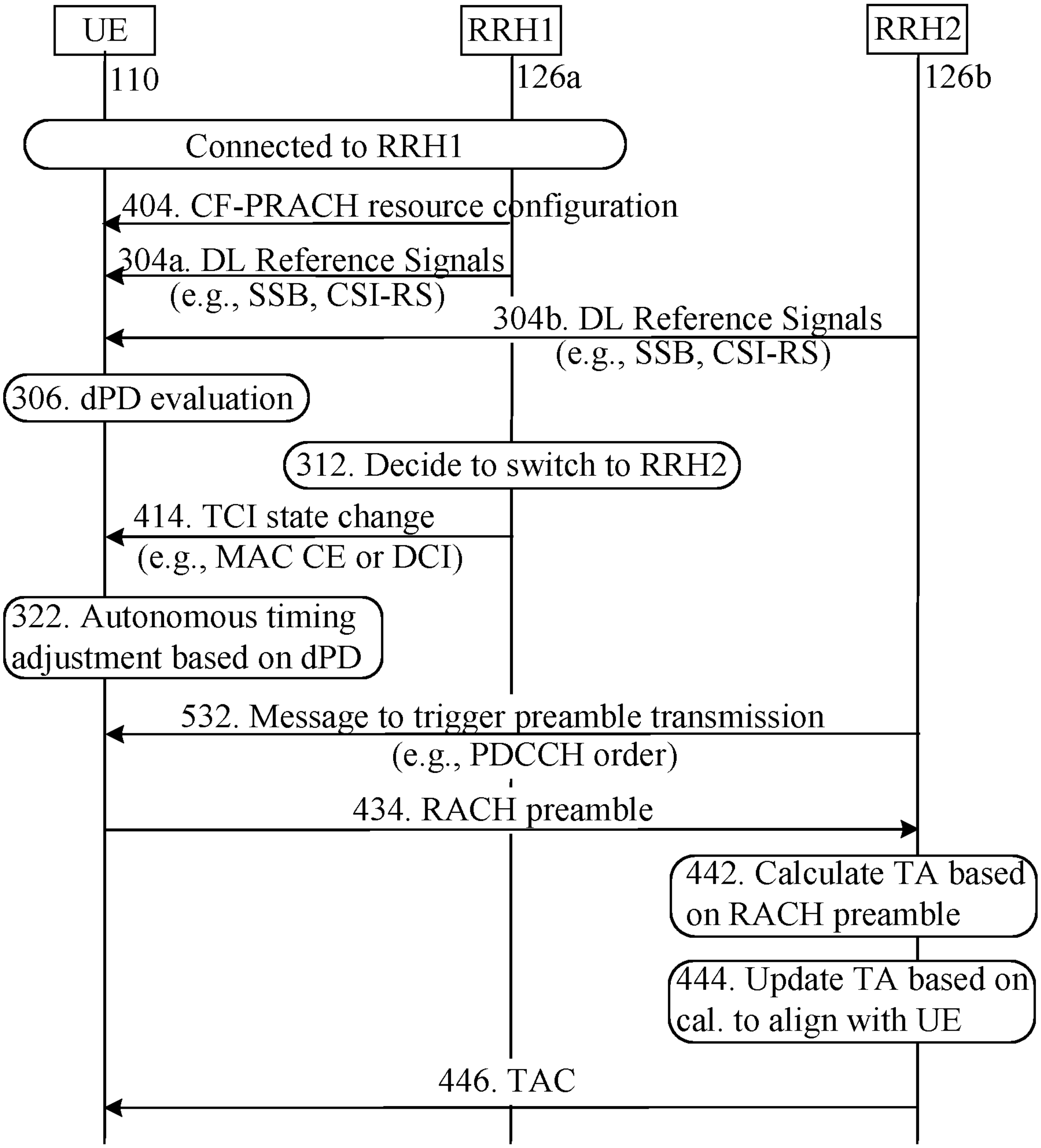
FIG. 9 is a message diagram illustrating a procedure for TA alignment between UE and the network in accordance with some example embodiments.

FIG. 9 illustrates another example procedure for TA alignment between UE and the network in accordance with some example embodiments. The procedure shown in FIG. 9 is substantially similar to the procedure in FIG. 7, and a difference is that in FIG. 9 the network may trigger the transmission of RA preamble by a command such as a PDCCH order. In FIG. 9, operations similar to those in FIG. 7 are denoted with similar numerals and a repetitive description will be omitted.

Referring to FIG. 9, when the first RRH 126*a* has transmitted a TCI state change command to the UE 110 to trigger a beam switching at 414 or when the base station 120 has been informed by the UE 110 that the UE 110 has performed an autonomous beam switching, the second RRH 126*b* may send a message to trigger transmission of a random access preamble to the UE 110 at 532. In some example embodiments, the message may include a PDCCH order to trigger the preamble transmission. In response to the PDCCH order, the UE 110 will transmit a contention based or contention free preamble to the second RRH 126*b*, and the base station 120 can implement the TA alignment based on the preamble.

In some example embodiments where the RRHs 126*a*, 126*b* belong to different base stations, when the source base station including the RRH 126*a* triggers the beam switching for the UE 110 at the operation 414, the source base station may indicate the beam switching to the target base station including the RRH 126*b* and further send UE context information via an Xn interface to the target base station. The UE context may include information such as UE TA maintained at the network side. In some example embodiments, instead of the operation 404, the RRH 126*b* may allocate resources for transmission of the RA preamble when it receives the indication of beam switching for the UE 110.

Figure 10:
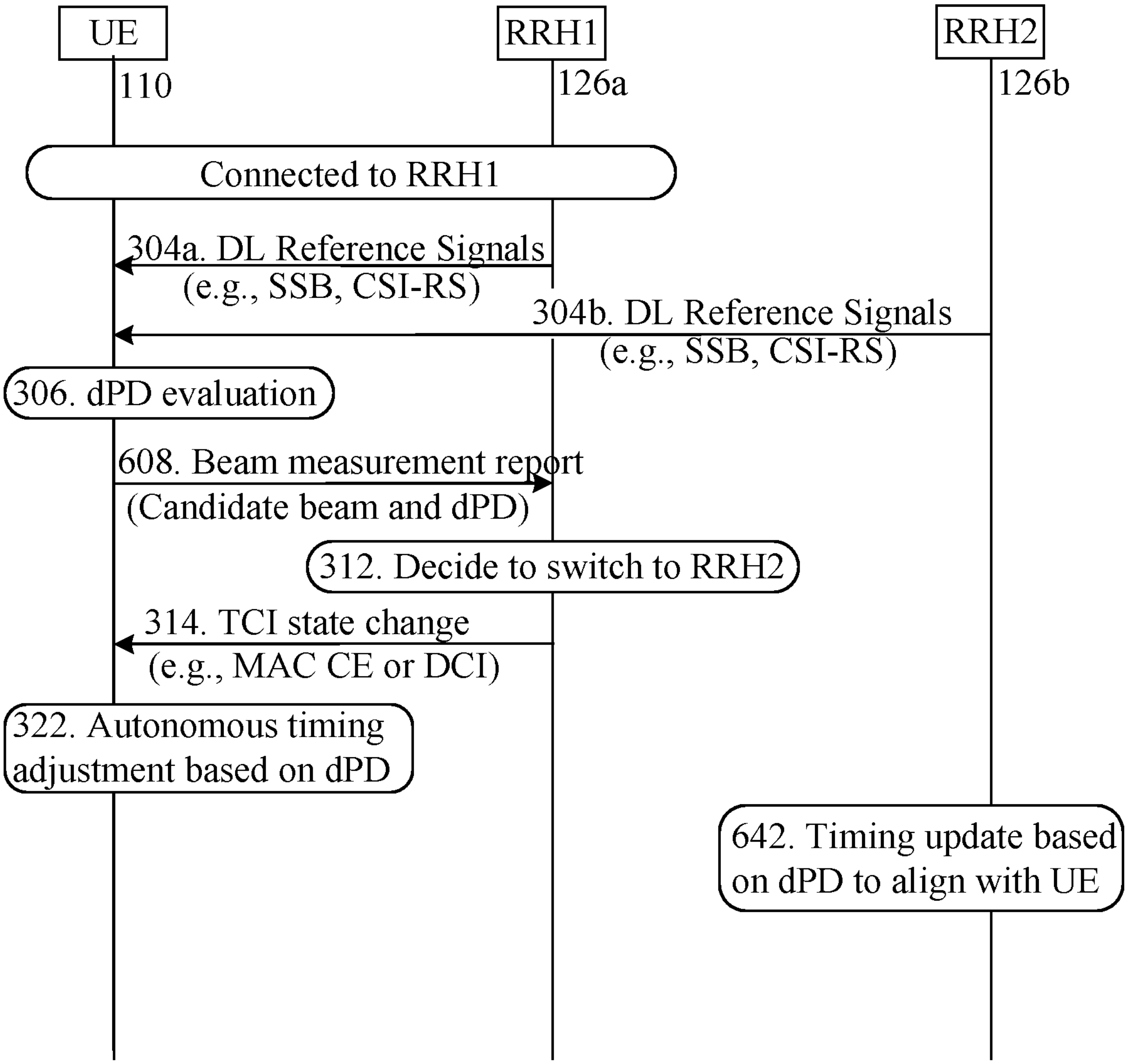
FIG. 10 is a message diagram illustrating a procedure for TA alignment between UE and the network in accordance with some example embodiments.

In the above example embodiments, the network performs the TA alignment in response to a message e.g. the autonomous TA report or the PRACH preamble from the UE 110. In some example embodiments, the network may perform the TA alignment proactively, an example of which is shown in FIG. 10. In FIG. 10, operations similar to those in FIGS. 6, 7, 9 are denoted with similar numerals and a repetitive description is omitted here.

Referring to FIG. 10, at 608, the UE 110 may send a beam measurement report to the base station 120. The beam measurement report may comprise one or more candidate beams for the UE 110. The beam measurement report may also indicate a propagation delay difference between the serving beam of the UE 110 (the first beam Beam1 of the RRH 126*a*) and the one or more candidate beams. As discussed above, the propagation delay difference may be determined by measuring the DL RSs such as SSB and/or CSI-RS carried on the candidate beams. Here it is assumed that the second beam Beam2 of the RRH 126*b* is the strongest candidate beam for the UE 110. The base station 120 decides to switch the UE 110 from the current serving beam (the first beam Beam 1 of the RRH 126*a*) to the second beam Beam2 of the RRH 126*b* at 312 and sends a TCI state change command to the UE 110 at 314.

As the base station 120, which is associated with both the RRHs 126*a* and 126*b*, knows the propagation delay difference of the second beam Beam2 of the second (target) RRH 126*b* relative to the first beam Beam1 of the first (source) RRH 126*a* from the beam measurement report at the operation 608, the base station 120 can perform TA alignment based on the propagation delay difference of the second beam Beam2 at 642 after it sends the TCI state change command to the UE 110 at 314. In some example embodiments, the base station 120 may monitor UL transmissions from the UE 110 to the first RRH 126*a* and the second RRH 126*b* to confirm if the beam switching is successful or not. When the base station 120 determines that the beam switching has been performed successfully, the base station 120 may perform the TA alignment. In some example embodiments, the base station 120 may perform the TA alignment when it is informed by the UE 110 that the UE 110 has autonomously switched to the second beam Beam2 of the RRH 126*b*.

In some example embodiments where the RRHs 126*a*, 126*b* belong to different base stations, the UE 110 sends the beam measurement report including the candidate beams and the timing difference (dPD) of the candidate beams relative to the serving beam may be sent to the source base station including the first RRH 126*a*. When the source base station triggers the beam switching for the UE 110 at the operation 314, the source base station may indicate the beam switching to the target base station including the RRH 126*b*. For example, source base station may notify the target base station of the target beam and the timing difference (dPD) of the target beam relative to the source beam. The source base station may further send UE context information via an Xn interface to the target base station. The UE context may include information such as UE TA maintained at the network side.

Figure 11:
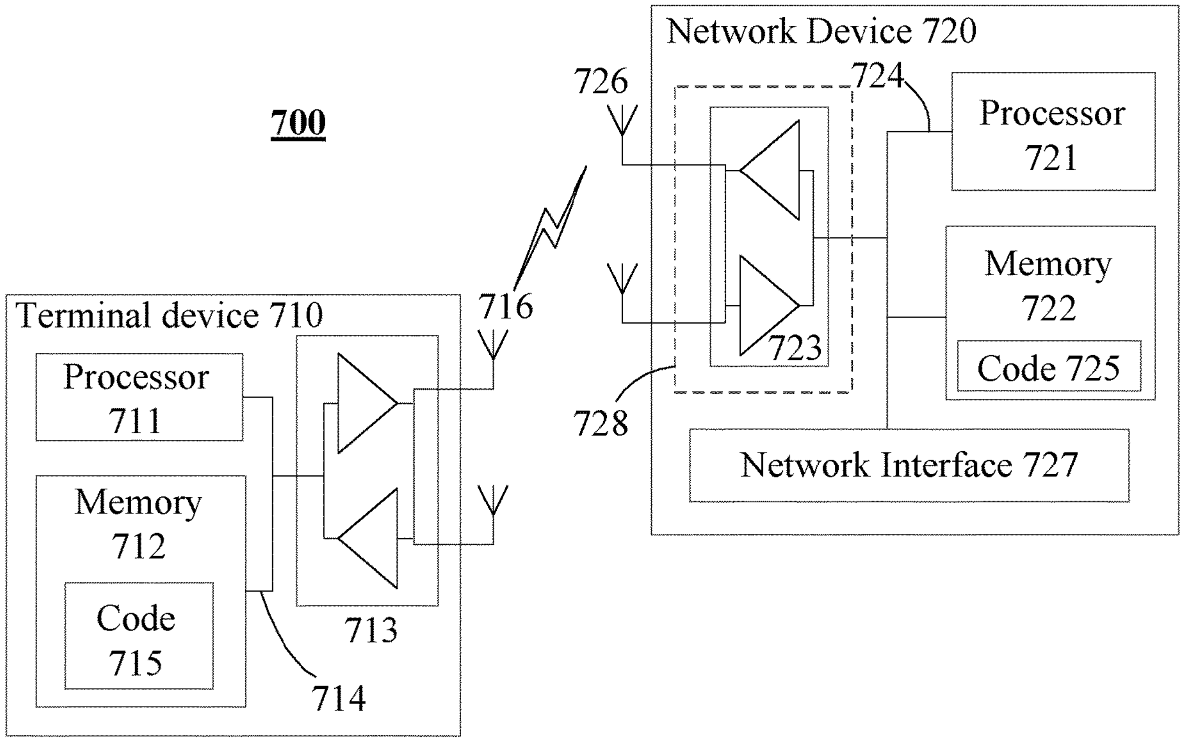
FIG. 11 is a schematic block diagram illustrating devices in a communication system for implementing one or more example embodiments.

FIG. 11 is a schematic block diagram illustrating devices in a communication system 700 for implementing one or more example embodiments. As shown in FIG. 11, the communication system 700 may comprise a terminal device 710 which may be implemented as the UE 110 discussed above and a network device 720 which may be implemented as the base station 120 discussed above.

Referring to FIG. 11, the terminal device 710 may comprise one or more processors 711, one or more memories 712 and one or more transceivers 713 interconnected through one or more buses 714. The one or more buses 714 may be address, data, or control buses, and may include any interconnection mechanism such as series of lines on a motherboard or integrated circuit, fiber, optics or other optical communication equipment, and the like. Each of the one or more transceivers 713 may comprise a receiver and a transmitter, which are connected to one or more antennas 716. The terminal device 710 may wirelessly communicate with the network device 720 through the one or more antennas 716. The one or more memories 712 may include computer program code 715. The one or more memories 712 and the computer program code 715 may be configured to, when executed by the one or more processors 711, cause the terminal device 710 to perform processes and steps relating to the UE 110 as described above.

The network device 720 may comprise one or more processors 721, one or more memories 722, one or more transceivers 723 and one or more network interfaces 727 interconnected through one or more buses 724. The one or more buses 724 may be address, data, or control buses, and may include any interconnection mechanism such as a series of lines on a motherboard or integrated circuit, fiber, optics or other optical communication equipment, and the like. Each of the one or more transceivers 723 may comprise a receiver and a transmitter, which are connected to one or more antennas 726. The network device 720 may wirelessly communicate with the terminal device 710 through the one or more antennas 726. The one or more transceivers 723 and the one or more antennas 726 may be implemented as one or more remote radio heads (RRHs) 728. The one or more RRHs 728 may be collocated or located at different positions. The one or more buses 724 could be implemented in part as fiber optic cable to connect the RRHs 728 to other components of the network device 720. The one or more network interfaces 727 may provide wired or wireless communication links through which the network device 720 may communicate with other network devices, entities, elements or functions. The one or more memories 722 may include computer program code 725. The one or more memories 722 and the computer program code 725 may be configured to, when executed by the one or more processors 721, cause the network device 720 to perform processes and steps relating to the base station 120 as described above.

The one or more processors 711, 721 and 731 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 711, 721 and 731 may be configured to control other elements of the UE/network device/network element and operate in cooperation with them to implement the procedures discussed above.

The one or more memories 712, 722 and 732 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 712, 722 and 732 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A user equipment comprising:

at least one processor; and at least one memory including computer program code, the at least one memory and the computer program code being configured to, with the at least one processor, cause the user equipment to perform:

switching from a first beam associated with a first access point to a second beam associated with a second access point;

performing autonomous timing adjustment based on a timing difference between a first timing associated with the first access point and a second timing associated with the second access point; and transmitting assistant information related to the timing difference to the second access point, wherein transmitting assistant information related to the timing difference comprises:

transmitting a random access preamble to the second access point;

wherein the at least one memory and the computer program code are further configured to, with the at least one processor, cause the user equipment to perform:

receiving a message to trigger transmission of the random access preamble from the second access point, the message to trigger transmission of the random access preamble being received after receiving a transmission configuration indicator state change command from the first access point that triggers the switching to the second beam.

2. The user equipment of claim 1 wherein transmitting assistant information related to the timing difference comprises: reporting the autonomous timing adjustment to the second access point.

3. The user equipment of claim 2 wherein the autonomous timing adjustment report is carried in channel state information transmitted to the second access point.

4. The user equipment of claim 2 wherein the at least one memory and the computer program code are further configured to, with the at least one processor, cause the user equipment to perform:

receiving an instruction to report the autonomous timing adjustment from the first access point.

5. The user equipment of claim 4 wherein the instruction to report the autonomous timing adjustment is received via radio resource control signaling, downlink control information or a medium access control element.

6. The user equipment of claim 4 wherein the instruction to report the autonomous timing adjustment is received in a transmission configuration indicator state change command carried in downlink control information or a medium access control element.

7. The user equipment of claim 6 wherein the transmission configuration indicator state change command comprises a control resource set identity and/or a transmission configuration indicator state identity indicating the instruction to report the autonomous timing adjustment.

8. The user equipment of claim 1 wherein the at least one memory and the computer program code are further configured to, with the at least one processor, cause the user equipment to perform:

receiving configuration of resources for transmitting the random access preamble from the first access point or the second access point.

9. The user equipment of claim 1 wherein the at least one memory and the computer program code are further configured to, with the at least one processor, cause the user equipment to perform:

receiving an instruction to transmit the random access preamble upon the autonomous timing adjustment from the first access point.

10. The user equipment of claim 9 wherein the instruction to transmit the random access preamble upon the autonomous timing adjustment is received via radio resource control signaling, downlink control information or a medium access control element.

11. The user equipment of claim 9 wherein the instruction to transmit the random access preamble upon the autonomous timing adjustment is received in a transmission configuration indicator state change command carried in downlink control information or a medium access control element.

12. The user equipment of claim 11 wherein the transmission configuration indicator state change command comprises a control resource set identity and/or a transmission configuration indicator state identity indicating the instruction to transmit the random access preamble upon the autonomous timing adjustment.

13. The user equipment of claim 1 wherein transmitting assistant information for timing alignment comprises: transmitting one or more downlink propagation delay difference values between the first beam and one or more candidate beams in a beam measurement report to the first access point, the one or more candidate beams including the second beam.

14. The user equipment of claim 13 wherein the one or more downlink propagation delay difference values are transmitted before switching from the first beam to the second beam.

15. The user equipment of claim 1 wherein the first access point and the second access point are associated with one or two different base stations.

* * * * *